United States Patent Office 3,404,193
Patented Oct. 1, 1968

3,404,193
DEHYDROGENATION OF HYDROCARBONS
Laimonis Bajars, Princeton, N.J., assignor to Petro-Tex Chemical Corporation, Houston, Tex., a corporation of Delaware
No Drawing. Continuation-in-part of applications Ser. No. 52,776, Aug. 30, 1960; Ser. No. 72,327, Nov. 29, 1960; Ser. No. 145,992 and Ser. No. 145,993, Oct. 18, 1961; Ser. No. 156,953 and Ser. No. 156,956, Dec. 4, 1961; and Ser. No. 196,870, May 23, 1962. This application Dec. 4, 1962, Ser. No. 242,094
6 Claims. (Cl. 260—680)

This application is a continuation-in-part of my copending and now abandoned applications Ser No. 52,776, filed Aug. 30, 1960, entitled "Improved Dehydrogenation Process" which was a continuation-in-part of application Ser. No. 825,656, filed July 8, 1959, entitled "Dehydrogenation Process," now abandoned; Ser. No. 72,327, filed Nov. 29, 1960, entitled "Dehydrogenation Process"; Ser. No. 145,992, filed Oct. 18, 1961, entitled "Dehydrogenation of Hydrocarbons"; Ser. No. 145,993, filed Oct. 18, 1961, entitled "Dehydrogenation Process"; Ser. No. 156,953, filed Dec. 4, 1961, entitled "Dehydrogenation Process"; Ser. No. 156,956, filed Dec. 4, 1961, entitled "Dehydrogenation"; and Ser. No. 196,870, filed May 23, 1962, entitled "Dehydrogenation Process."

This invention relates to a process for dehydrogenating organic compounds and relates more particularly to the dehydrogenation of aliphatic hydrocarbons of 4 to 6 carbon atoms.

The dehydrogenation of aliphatic hydrocarbons such as butylenes to butadiene is accomplished commercially by passing butylenes at high temperatures over calcium-nickel-phosphate or iron oxide catalysts. In the case of calcium-nickel-phosphate, butadiene is obtained from butylenes at yields of 36 to 40 percent in a cyclic, non-continuous operation. Over iron oxide cataylsts, butylenes are converted to butadiene at yields of about 19 percent. While these yields are commerical, it has been a continuing object of those skilled in the art to provide processes with higher yields of butadiene and other unsaturated hydrocarbons.

Iodine has been disclosed for use in the dehydrogenation of hydrocarbons in U.S. Patent 2,890,253. Large quantities of iodine are required according to this patent as the iodine is used as a reactant in the process. According to this patent, normally one atom of iodine reacts with each atom of hydrogen from the hydrocarbon being dehydrogenated. For example, in the dehydrogenation of butane to butadiene, two mols of iodine react with two mols of hydrogen to convert butane to butadiene. The patentees teach that the amounts of iodine required in such a reaction may be reduced by adding oxygen to the process; however, the amount of oxygen used must be no greater than one mol of oxygen per atom of iodine present. In addition, the iodine must still be present in an amount of at least 0.1 mol per mol of hydrocarbon to be dehydrogenated, and preferably will be present in an amount of at least 0.2 mol of iodine. According to the examples even higher ratios are utilized, such as 1.3 mols of iodine per mol of hydrocarbon to be dehydrogenated. The molecular weight of iodine is 254 and this means that the dehydrogenation of butane with 1.3 mols of iodine, 330 pounds of iodine would be charged for each 58 pounds of butane. Because of the corrosive effect of iodine and hydrogen iodine, such reactions have been conducted in quartz or in glass lined reactors.

I have now discovered that greatly improved yields of unsaturated hydrocarbon of 4 to 6 carbons are obtained by dehydrogenating hydrocarbons of 4 to 6 carbon atoms in vapor phase in admixture with critical ratios of oxygen and iodine and an aluminum oxide, salt or carbide catalyst at elevated temperatures when the partial pressure of the hydrocarbon to be dehydrogenated is equivalent to no greater than 10 inches mercury at a total pressure of approximately 30 inches of mercury absolute, or one atmosphere.

The invention is suitably carried out by reacting at a temperature of at least 400° C. the mixture of the hydrocarbon to be dehydrogenated, iodine and oxygen, with the partial pressure of the hydrocarbon to be dehydrogenated being no greater than about 10 inches mercury absolute, in contact with the particular aluminum catalysts. The catalysts are autoregenerative and therefore the process is continuous.

Not only is the unexpectedly high selectivity and conversion of economic advantage for most efficient utilization of feed stock, as compared to prior art processes, but straightforward and efficient purification of the desired butadiene-1,3 is readily accomplished because of the high yield of butadiene-1,3 and the low concentration of impurities which have to be removed. In the present commercial processes, a series of prefractionation, extractive distillation and final fractionation steps are required to isolate butadiene from process streams in sufficient high purity for commercial use because of the low conversion of butylenes, and the resulting large amounts of difficult-to-separate impurities. An advantage of the process of this invention is that less tars and polymer are formed compared to suggested prior art processes.

According to this invention the process is conducted in the presence of an inorganic oxide, salt or carbide of aluminum. Suitable compounds are such as $Al_2O_3$, aluminum phosphate, aluminum fluoride, aluminum sulfate, aluminum carbide, mixtures thereof and the like. Some aluminum compounds may be converted under the conditions of reaction to these oxides or salts. For example, aluminum hydroxide may be converted to aluminum oxide under the conditions of reaction. Useful compounds are those which may be charged to the reactor in any form, such as organic compounds, but which will be converted to the oxide, carbide or inorganic salt, such as the halide, under the conditions of reaction. The corundum form of $Al_2O_3$ is suitable. Especially suitable aluminum compounds are $Al_2O_3$ and the inorganic salts, such as the salts of strong acids. Aluminas consisting essentially of $Al_2O_3$ such as the 5103 [1] or SA 104 commercial aluminas manufactured by Norton Company give excellent results. Typical catalysts useful according to this invention will preferably have an apparent porosity [2] of at least 10%, and usually at least 25%, and a volumetric bulk density [3] of at least 25 pounds per cubic foot. The aluminum compounds useful as catalysts will usually have melting or decomposition points of greater than 450° C.

A preferred feature of this invention is the use of an amount of alkali and/or alkaline earth material incorporated with the above described aluminum compounds. Improved results such as higher yields, selectivities and conversions may be obtained by the use of such combinations. The alkali or alkaline earth compounds may conveniently be present in such forms as the oxides, hydroxides, halides or as precursors of these compounds. Under the conditions of reaction the alkali and alkaline earth compounds will be inorganic. The alkali and/or alkaline earth atoms may also be bonded to the aluminum under the conditions of reaction. The amount of alkali ---
[1] Described in Norton Refractories Division bulletin CP 6.2, Norton Company, Worcester, Mass.
[2] ASTM Designation: C373–55T (1955).
[3] Obtained by weighing one cubic foot of material packed loosely.

and/or alkaline earth metal compounds may be varied quite widely and while small amounts as low as one-tenth weight percent have been used, much larger amounts may be employed. Generally the total amount of alkali and alkaline earth compounds will be from 0.1 to 25 weight percent of the total and will usually be between about one and ten weight percent of the combined weight of the aluminum compound and alkali and/or alkaline earth compound. On an atomic basis the atom of alkali elements and/or alkaline earth elements will ordinarily be present in an amount of between 0.025 and 0.4 atoms per atom of aluminum. Alkali and alkaline earth compounds which are suitable are such as lithium chloride, lithium oxide, strontium oxide, potassium bromide, potassium iodide, sodium chloride, magnesium oxide, calcium oxide, barium oxide, mixtures thereof and the like.

The total pressure on systems employing the process of this invention normally will be about or in excess of atmospheric pressure, although subatmospheric pressure can be used. Higher pressures, such as about 100 or 200 p.s.i.g. may be used. However, the initial partial pressure of the hydrocarbon to be dehydrogenated is an important and critical feature of the invention. The partial pressure of the hydrocarbon to be dehydrogenated should be equivalent to below about 10 inches mercury absolute, or ⅓ atmosphere, when the total pressure is one atmosphere to realize the advantages of this invention. Also because the initial partial pressure of the hydrocarbon to be dehydrogenated is equilavent to less than about 10 inches of mercury at a total pressure of one atmosphere, the combined partial pressure of the hydrocarbon to be dehydrogenated plus the dehydrogenated hydrocarbon will also be equivalent to less than about 10 inches of mercury. For example, if butene is being dehydrogenated to butadiene, at no time will the combined partial pressure of the butene and butadiene be greater than equivalent to about 10 inches of mercury at a total pressure of one atmosphere. Preferably the hydrocarbon to be dehydrogenated should be maintained at a partial pressure equivalent to less than one-third the total pressure, such as no greater than six inches or no greater than four inches of mercury, at a total pressure of one atmosphere. The desired pressure is obtained and maintained by techniques including vacuum operations, or by using helium, organic compounds, nitrogen, steam and the like, or by a combination of these methods. Steam is particularly advantageous and it is surprising that the desired reactions to produce high yields of product are effected in the presence of large amounts of steam. When steam is employed, the ratio of steam to hydrocarbon to be dehydrogenated is normally within the range of about 4 to 20 or 30 mols of steam per mol of hydrocarbon, and generally will be between 8 and 15 mols of steam per mol of hydrocarbon. When air is employed as the source of oxygen, then less steam normally will be required. The degree of dilution of the reactants with steam, nitrogen and the like is related to keeping the partial pressure of hydrocarbon to be dehydrogenated in the system equivalent to preferably below 10 inches of mercury at one atmosphere total pressure. For example, in a mixture of one mol of butene, three mols of steam and one mol of oxygen under a total pressure of one astmosphere the butene would have an absolute pressure of one-fifth of the total pressure, or roughly six inches of mercury absolute pressure. Equivalent to this six inches of mercury butene absolute pressure at atmospheric pressure would be butene mixed with oxygen and iodine under a vacuum such that the partial pressure of the butene is six inches of mercury absolute. A combination of a diluent such as steam together with a vacuum may be utilized to achieve the desired partial pressure of the hydrocarbon. For the purpose of this invention, also equivalent to the six inches of mercury butene absolute pressure at atmospheric pressure would be the same mixture of one mol of butene, three mols of steam and one mol of oxygen under a total pressure greater than atmospheric, for example, a total pressure of 15 or 20 inches mercury above atmospheric. Thus, when the total pressure on the reaction zone is greater than one atmosphere, the absolute values for the pressure of butene will be increased in direct proportion to the increase in total pressure above one atmosphere. Another feature of this invention is that the combined partial pressure of the hydrocarbon to be dehydrogenated plus the iodine liberating material will also be equivalent to less than 10 inches of mercury, and preferably less than 6 or 4 inches of mercury, at a total pressure of one atmosphere. The lower limit of hydrocarbon partial pressure will be dictated by commercial considerations and practically will be greater than about 0.1 inch mercury.

The minimum amount of oxygen used generally will be from about one-fourth mol of oxygen per mol of hydrocarbon to be dehydrogenated to about 2 mols or more of oxygen per mol of hydrocarbon, as much as 5 mols have been employed. Optimum selectivity has been obtained when amounts of oxygen from about 0.25 to about 1 mol of oxygen per mol of hydrocarbon to be dehydrogenated were employed. High conversions have been obtained when the amount of oxygen was varied from about 0.75 to about 1.75 mols of oxygen per mol of hydrocarbon to be dehydrogenated. Maximum yields of unsaturated hydrocarbon product have been obtained with amounts of oxygen from about 0.4 to about 1.25 mols of oxygen per mol of hydrocarbon to be dehydrogenated, that within the range of 0.25 or 0.35 to 1.75 mols of oxygen per mol of hydrocarbon to be dehydrogenated, economic and operational considerations will dictate the exact molar ratio of hydrocarbon to oxygen used. A particularly useful range is from about one-half to one mol of oxygen per mol of hydrocarbon to be dehydrogenated. Oxygen is supplied to the system as pure oxygen or may be diluted with inert gases such as helium, carbon dioxide and nitrogen as air. In relation to iodine, the amount of oxygen employed preferably will be greater than 2 gram mols of oxygen per gram mol of iodine and normally will be greater than 4 gram mols of oxygen per gram mol of iodine. Usually the ratio of the mols of oxygen to the mols of iodine will be from 5 to 8 to 500 and preferably will be between 15 and 300 mols of oxygen per mol of iodine.

Iodine employed in the procses of this invention may be iodine itself, hydrogen iodide, or other inorganic iodides, organic iodides or any iodine containing compound which decomposes under the reaction conditions defined herein to provide free iodine or hydogen iodide. Such organic iodine compounds may include aliphatic iodides including alkyl iodides such as methyl iodide, ethyl iodide, propyl iodide, butyl iodide, amyl iodide, hexyl iodide, octyl iodide, iodoform and the like. Both primary, secondary and tertiary alkyl iodides may be employed. Similarly, aromatic and heterocyclic iodides may be employed, for example, phenyliodide, benzyl iodide, cyclohexyl iodide, and the like. Additional iodine compounds are iodohydrins such as ethylene iodohydrin; iodo substituted aliphatic acids such as iodoacetic acid; organic amine iodide salts of the general formula $R_xN \cdot HI$, wherein R is a hydrocarbon radical containing from 1 to 8 carbon atoms such as methyl amine hydroiodide; volatile metalloid iodides such as $AsI_3$; and other iodine compounds such as $SI_4$, $SI_6$, $SOI_2$, $IO_2$, $I_2O_5$, $CHI_4$, $CI_4$, and the like. Generally the iodine compounds will have a boiling or decomposition point of less than 400° C. Preferred, of course, among the organic iodides, for ease of handling are the alkyl iodides of 1 to 6 carbon atoms. Preferred are iodine and/or hydrogen iodide. It is an advantage of this invention that hydrogen iodide may be employed as the iodine source, with one advantage being that the hydrogen iodide in the effluent from the reactor may be fed directly back to contact the hydrocarbons in the dehydrogenation reactor without any necessity of converting the hydrogen iodide to iodine. It is understood than when a quantity of iodine is referred to herein, both in the specification and the claims, that this refers to the calculated quanttiy of iodine in all forms present in the vapor space under the conditions of reaction regardless of the initial source or the form in which the iodine is present. For example, a reference to 0.05 mol of iodine would refer to the quantity of iodine present whether the iodine was fed as 0.05 mol of $I_2$ or 0.10 mol of HI.

The iodine concentration normally will be varied from at least about 0.001 mol, such as at least 0.0001 mol, to about 0.2 mol of iodine per mol of hydrocarbon to be dehydrogenated. It is preferred to use less than 0.1 mol of iodine per mol of hydrocarbon to be dehydrogenated. Amounts of iodine between 0.005 and 0.08 or 0.09 mol of iodine per mol of hydrocarbon to be dehydrogenated are preferred. A suitable ratio is between about 0.01 and 0.05 mol of iodine per mol of hydrocarbon to be dehydrogenated. It is one of the advantages of this invention that in accordance with the defined process, very small amounts of iodine may be used in the dehydrogenation of aliphatic hydrocarbons as compared to prior art processes. Preferably the iodine will be present in an amount no greater than 5 or 10 mol percent of the total feed to the dehydrogenation zone. Normally the iodine will be present from about 2 to 25 weight percent of the hydrocarbon to be dehydrogenated.

Hydrocarbons to be dehydrogenated according to the process of this invention are aliphatic hydrocarbons of 4 to 6 carbon atoms and preferably are selected from the group consisting of mono-olefins or diolefins of 4 to 6 carbon atoms, saturated aliphatic hydrocarbons of 4 to 5 carbon atoms and mixtures thereof. Examples of feed materials are butene-1, cisbutene-2, transbutene-2, 2-methyl butene-3, 2-methyl butene-1, 2-methyl butene-2, n-butane, isobutane, butadiene-1,3, methyl butane, 2-methyl pentene-1, 2-methyl pentene-2 and mixtures thereof. For example, n-butane may be converted to a mixture of butene-1 and butene-2 or may be converted to a mixture of butene-1, butene-2 and/or butadiene-1,3. A mixture of n-butane and butene-2 may be converted to butadiene-1,3 or a mixture of butadiene-1,3 together with some butene-2 and butene-1. n-Butane, butene-1, butene-2 or butadiene-1,3 or mixtures thereof may be converted to vinyl acetylene. The reaction temperature for the production of vinyl acetylene is normally within the range of about 600° C. to 1000° C. such as between 650° C. and 850° C. Isobutane may be converted to isobutylene. The 2-methyl butenes such as 2-methyl butene-1 may be converted to isoprene. Excellent starting materials are the four carbon hydrocarbons such as butene-1, cis or trans butene-2, n-butane, and butadiene-1,3 and mixtures thereof. Useful feeds as starting materials may be mixed hydrocarbon streams such as refinery streams. For example, the feed material may be the olefin-containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominately hydrocarbon stream containing predominately hydrocarbons of four carbon atoms may be produced and may comprise a mixture of butenes together with butadiene, butane, isobutane, isobutylene and other ingredients in minor amounts. These and other refinery by-products which contain normal ethylenically unsaturated hydrocarbons are useful as starting materials. Another source of feedstock is the product from the dehydrogenation of butane to butenes employing the Houdry Process. Although various mixtures of hydrocarbons are useful, the preferred hydrocarbon feed contains at least 50 weight percent butene-1, butene-2, n-butane and/or butadiene-1,3 and mixtures thereof, and more preferably contains at least 70 percent n-butane, butene-1, butene-2 and/or butadiene-1,3 and mixtures thereof. Any remainder usually will be aliphatic hydrocarbons. The process of this invention is particularly effective in dehydrogenating aliphatic hydrocarbons to provide a product wherein the major unsaturated product has the same number of carbon atoms as the feed hydrocarbon.

In the above descriptions of catalyst compositions, the composition described is that of the surface which is exposed in the dehydrogenation zone to the reactants. That is, if a catalyst carrier is used, the composition described as the catalyst refers to the composition of the surface and not to the total composition of the surface coating plus carrier. The catalytic compositions are intimate combinations or mixtures of the ingredients. These ingredients may or may not be chemically combined or alloyed. Inert catalyst binding agents or fillers may be used, but these will not ordinarily exceed about 50 percent or 65 percent by weight of the catalytic surface. The weight percent of the aluminum atoms will generally be at least 20 percent, and preferably at least 35 percent of the composition of the catalyst surface exposed to the reaction gases.

The amount of solid catalyst utilized may be varied depending upon such variables as the activity of the catalyst, the amount of iodine and oxygen used, the flow rates of reactants and the temperature of reaction. The ratio of square feet of catalyst surface per cubic foot of reaction zone containing catalyst will be at least 40 square feet of catalyst surface per cubic foot of reaction zone. The catalyst is more effectively utilized when the catalyst is present in an amount of at least 75 square feet of catalyst surface per cubic foot of reaction zone containing catalyst, and preferably the ratio of catalyst surface to volume will be at least 120 square feet of catalyst surface per cubic foot of reaction zone containing catalyst. Of course, the amount of catalyst surface may be much greater when irregular surface catalysts are used. When the catalyst is in the form of particles, either supported or unsupported, the amount of catalyst surface may be expressed in terms of the surface area per unit weight of any particular volume of catalyst particles. The ratio of catalytic surface to weight will be dependent upon various factors including the particle size, particle distribution, apparent bulk density of the particles, amount of active catalyst coated on the carrier, density of the carrier, and so forth. Typical values for the surface to weight ratio are such as about ½ to 200 square meters per gram,[1] although higher and lower values may be used.

Excellent results have been obtained by packing the reactor with catalyst particles as the method of introducing the catalytic surface. The size of the catalyst particles may vary widely but generally the maximum particles size will at least pass through a Tyler Standard Screen which has an opening of 2 inches, and generally the largest particles of catalyst will pass through a Tyler Screen with one inch openings. Very small particle size carriers may be utilized with the only practical objection being that extremely small particles cause excessive pressure drops across the reactor. In order to avoid high pressure drops across the reactor generally at least 50 percent by weight of the catalyst will be retained by a 10 mesh Tyler Standard Screen which has openings of 1/16 inch. However, if a fluid bed reactor is utilized, catalyst particles may be quite small, such as from about 10 to 300 microns. Thus, the particle size when particles are used preferably will be from about 10 microns to a particle size which will pass through a Tyler Screen with openings of 2 inches. If a carrier is used the catalyst may be deposited on the carrier by methods known in the art such as by preparing an aqueous solution or dispersion of the catalyst compound, mixing the carrier with the solution or dispersion until the active ingredients are coated on the carrier. The coated particles may then be dried, for example, in an oven at a temperature of greater than 100° C. Various other methods of catalyst preparation known

---

[1] According to the Innes nitrogen absorption method reported in, Innes, W.B., Anal. Chem., 23, 759 (1951).

to those skilled in the art may be used. When carriers are utilized, these will be approximately of the same size as the final coated catalyst particle, that is, for fixed bed processes the carriers will generally be retained on 10 mesh Tyler Screen and will pass through a Tyler Screen with openings of 2 inches. Very useful carriers are silicon carbide, asbestos, and the like. When carriers are used, the amount of catalyst on the carrier will generally be in the range of about 5 to 75 weight percent of the total weight of the active catalytic material plus carrier. The carriers may be of a variety of shapes, including irregular shapes, cylinders or spheres. Other methods may be utilized to introduce the catalytic surface such as by the use of rods, wires, mesh or shreds and the like of catalytic material. The technique of utilizing fluid beds lends itself well to the process of this invention.

The temperature at which the reaction is conducted is from above 400° C. or 450° C. to temperatures as high as 800° C. or 1000° C. or higher. Excellent results are ordinarily obtained within the range of about 425° C. to about 800° C. or 850° C. Butadiene-1,3 has been obtained in good yield from butene at about 550° C. to about 750° C., and isoprene has been obtained in good yield from methyl butene at temperatures from about 425° C. to 550° C. or 625° C. Vinyl acetylene is produced in good yields for butane, butene-1, butene-2, butadiene-1,3 and mixtures thereof at temperatures above 600° C., such as above 650° C. The temperatures are measured at the maximum temperature in the reactor. An advantage of this invention is the extremely wide latitude of reaction temperatures.

The flow rates of the gaseous reactants may be varied quite widely and can be readily established by those skilled in the art. Good results have been obtained with flow rates of the hydrocarbon to be dehydrogenated ranging from about one-fourth to three or higher liquid volumes of hydrocarbon to be dehydrogenated per volume of reactor containing catalyst per hour. Generally, the flow rates will be within the range of about 0.10 to 25 or higher liquid volumes of the hydrocarbon to be dehydrogenated, calculated at standard conditions of 25° C. and 760 mm. of mercury per volume of reactor space containing catalyst per hour (referred to as either LHSV or liquid v./v./hr.) Usually the LHSV will be between 0.15 and 15. The volume of reactor containing catalyst is that volume of reactor space excluding the volume displaced by the catalyst. For example, if reactor has a particular volume of cubic feet of void space, when that void space is filled with catalyst particles the original void space is the volume of reactor containing catalyst for the purpose of calculating the flow rates. The residence or contact time of the reactants in the reaction zone under any given set of reaction conditions depends upon all the factors involved in the reaction. Contact times ranging from about 0.1 to about 5 to 10 seconds have been found to be satisfactory. However, a wider range of residence times may be employed which may be as low as about 0.001 or 0.01 second to as long as several minutes, as high as about 3 minutes, although such long reaction times are not preferred. Normally, the shortest contact time consonant with optimum yields and operating conditions is desired. Residence time is the calculated dwell time of the reaction mixture in the reaction zone assuming the mols of product mixture are equivalent to the mols of feed mixture. For the purpose of calculation of residence times the reaction zone is the portion of the reactor packed with the catalyst.

A variety of reactor types may be employed. For example, tubular reactors may be employed. Fixed bed reactors containing the catalysts in the form of grids, screens, pellets, with or without supports and the like may also be used. In any of these reactors suitable means for heat control should be provided. Fluid and moving bed systems are readily applied to the processes of this invention.

The manner of mixing the iodine or iodine compound, the hydrocarbon to be dehydrogenated, oxygen, and steam, if employed, is subject to some choice. In normal operations the hydrocarbon to be dehydrogenated may be preheated and mixed with steam and preheated oxygen or air and iodine or hydrogen iodide are mixed therewith prior to passing the stream in vapor phase over the catalyst bed. Hydrogen iodide or a source of iodine may be dissolved in water and may be mixed with steam or air prior to reaction. Any of the reactants may be split and added incrementally. For example, part of the iodine may be mixed with the hydrocarbon to be dehydrogenated and the oxygen. The mixture may then be heated to effect some dehydrogenation and thereafter the remainder of the iodine added to effect further dehydrogenation. The reactor may be of any type. Conventional reactors used for the preparation of unsaturated hydrocarbons are satisfactory and the reactor may be packed or unpacked. The effluent reaction product from the reactor is cooled and then passed to means for removing iodine such as in a caustic scrubber. The hydrocarbon product is then suitably purified as by fractionation to obtain the desired high purity unsaturated product. The effluent reaction product from the reactor is cooled and then is passed to means for removing hydrogen iodide which normally will represent much of the iodine present during the course of the reaction, and the hydrocarbon product is then suitably purified as by fractionation to obtain the desired high purity butadiene or isoprene.

According to this invention the catalyst is autoregenerative and thus the process is continuous. Little or no energy input is required for the process and it may be operated essentially adiabatically. Moreover, small amounts of tars and polymers are formed as compared to prior art processes suggesting the use of large amounts of iodine.

In the following examples will be found specific embodiments of the invention and details employed in the practice of the invention. Percent conversion refers to the mols of olefin consumed per 100 mols of olefin fed to the reactor, percent selectivity represents the mols of diolefin formed per 100 mols of olefin consumed, and percent yield refers to the mols of diolefin formed per mol of olefin fed. All quantities of iodine expressed are calculated as mols of $I_2$.

Example 1

The flow rates for the liquid hourly space velocity were calculated on the liquid volume of butene-2, calculated at 25° C. and 760 mm. of mercury per volume of reactor space which is at the specified temperature of reaction. The volume of reactor space for purposes of calculation of flow rates is the volume of reactor space with no deduction for the space displaced by the catalyst particles.

The feed was butene-2 of a purity of over 99 mol percent. The temperature of the reactor was measured by a thermocouple extending into the reactor, and the temperature of reaction reported is the temperature of the hot spot in the catalyst bed. This temperature is roughly the maximum temperature in the reactor. The oxygen was fed as pure oxygen. All of the reactants were added prior to contact with the Vycor rings.

A Vycor [1] reactor which was filled with Vycor [1] Raschig rings having deposited thereon aluminum phosphate was heated by means of an external electric furnace. At a 700° C. furnace temperature, a butene-2 flow rate was maintained at 1 liquid v./v./hr., mixed with oxygen and steam at mol ratios of butene to steam to oxygen of 1 to 16 to 0.85. Hydrogen iodide was added as concentrated 47 percent acid at 3.75 cubic centimeters per hour which was equivalent to 0.017 mol of iodine per mol of butene-2. When the reactor was filled with clean Vycor Raschig rings and operated as described a yield

---

[1] The Vycor of this and the following examples is a 96 percent silica glass. This is a trademark of Corning Glass Works, Corning, N.Y.

of butadiene-1,3 of 24 percent was obtained. When this reaction was repeated in the absence of hydrogen iodide, the yield of butadiene obtained was 18 percent. The reactor was then filled with Vycor Rasching rings having deposited thereon aluminum phosphate. The mol percent conversion was 78, the mol percent selectivity was 73 and the yield was 57 mol percent butadiene-1,3.

Example 2

This example was made in a 1-inch internal diameter reactor. The reactor interior was completely ceramic clad. The oxygen, fed as air, butene-2, and water were fed into the top of the reactor. These ingredients were fed through a preheat section which was about 16 inches long and was encompassed by an electric furnace. The preheat section was packed with 6 mm. x 6 mm. Vycor rings. The iodine was introduced at the end of the preheat section. The reactor section was about 20 inches long and had a capacity of about 250 cc. The reactor section was also encompassed by an electric furnace, having contained a ¼ inch thermowell. The hot gasses leaving the reactor were quenched immediately with cool water.

The catalytic material was an irregular 4 to 8 mesh alumina manufactured by the Carborundum Company. The analysis by weight was approximately 85 percent $Al_2O_3$, .40CaO, .30MgO, .30$K_2O$, 2.0$TiO_2$, .90$Fe_2O_3$ and 11$SiO_2$. The porosity was approximately 45 percent, and the average pore size was about 300–350 microns. The volumetric bulk density was about 50 lbs./ft.$^3$. The liquid hourly space velocity calculated at 760 mm. and 60° C. (LHSV), for all of the runs was 1.0. The LHSV flow rates were based on the total 20 inch catalyst bed. The steam to butene-2 ratio was 13, and the oxygen to butene-2 ratio was 0.7 mol of $O_2$ per mol of butene-2. Iodine was fed at a rate equivalent to 0.02 mol of $I_2$ per mol of butene-2. At a maximum temperature in the reactor of about 625° C., the conversion of butene-2 was 42 mol percent, the selectivity was 93 mol perecnt, for a yield of butadiene-1,3 of 39 mol percent.

From the foregoing description of the invention, it will be seen that a novel and greatly improved process for producing unsaturated hydrocarbons is provided. Other examples could be devised for a process whereby the catalyst contained the described elements; preferably with the described elements constituting greater than or at least fifty atomic weight percent of any metal atoms in the surface exposed to the reactor gases. Although representative embodiments of the invention have been specifically described, it is not intended or desired that the invention be limited solely thereto since it will be apparent to those skilled in the art that modifications and variations may be made without departing from the spirit and scope of the invention.

I claim:
1. The method for dehydrogenating aliphatic hydrocarbons of 4 to 6 carbon atoms which comprises heating in the vapor phase at a temperature of greater than 400° C. the aliphatic hydrocarbons with oxygen in a molar ratio of at least one-fourth mol of oxygen per mol of said aliphatic hydrocarbons, iodine in a molar ratio of at least about 0.001 mol of iodine per mol of said aliphatic hydrocarbons, the partial pressure of said aliphatic hydrocarbons being equivalent to less than about 10 inches mercury at one atmosphere total pressure, with an aluminum oxide catalyst.

2. The method for dehydrogenating aliphatic hydrocarbons of 4 to 6 carbon atoms which comprises heating in the vapor phase at a temperature of about 450° C. to 750° C. the said aliphatic hydrocarbon with oxygen in a molar ratio of about 0.4 to about 1.25 mol of oxygen per mol of said aliphatic hydrocarbon, iodine in a molar ratio of about 0.005 to 0.08 mol of iodine per mol of said aliphatic hydrocarbon, the partial pressure of said aliphatic hydrocarbon being equivalent to less than about 6 inches mercury at one atmosphere total pressure, with an aluminum oxide catalyst, the ratio of the mols of said oxygen to the said iodine being greater than two.

3. The method for dehydrogenating aliphatic hydrocarbons of 4 to 5 carbon atoms which comprises heating in the vapor phase at a temperature of about 450° C. to 1000° C., the said aliphatic hydrocarbon with oxygen in a molar ratio of at least 0.4 mol of oxygen per mol of said aliphatic hydrocarbon, iodine in a molar ratio of at least about 0.001 mol of iodine per mol of said aliphatic hydrocarbon, and steam in a molar ratio of about 4 to 30 mols of steam per mol of said aliphatic hydrocarbon, with an aluminum oxide catalyst.

4. The method for dehydrogenating aliphatic hydrocarbons which comprises heating in the vapor phase at a temperature of at least 450° C. an aliphatic hydrocarbon of 4 to 5 carbon atoms with oxygen, and iodine in an amount of at least 0.001 mol of iodine per mol of said aliphatic hydrocarbon, the partial pressures of said aliphatic hydrocarbon being no greater than equivalent to 6 inches of mercury at a total pressure of one atmosphere with an aluminum oxide catalyst, the ratio of the mols of said oxygen to the atoms of said iodine being greater than four.

5. The method for dehydrogenating aliphatic hydrocarbons which comprises heating in the vapor phase at a temperature of at least about 450° C. an aliphatic hydrocarbon selected from the group consisting of n-butane, n-butene, methyl butene, and mixtures thereof with oxygen in a molar ratio of about 0.25 to about 1.75 mol of oxygen per mol of said aliphatic hydrocharbon, iodine in a molar ratio of at least about 0.001 mol of iodine per mol of said aliphatic hydrocarbon, the partial pressure of the said aliphatic hydrocarbon being equivalent to no greater than 6 inches of mercury at a total pressure of one atmosphere, with an aluminum oxide catalyst, the ratio of the mols of said oxygen to the mols of said iodine being greater than two.

6. The method for dehydrogenating aliphatic hydrocarbons which comprises heating in the vapor phase at a temperature of at least about 450° C. an aliphatic hydrocarbon selected from the group consisting of n-butane, n-butene, methyl butene, and mixtures thereof, with oxygen in a molar ratio of about 0.25 to about 1.75 mol of oxygen per mol of said aliphatic hydrocarbon, iodine in a molar ratio of at least about 0.001 mol of iodine per mol of said aliphatic hydrocarbon, the partial pressure of the said aliphatic hydrocarbon being equivalent to no greater than 6 inches of mercury at a total pressure of one atmosphere, with an aluminum phosphate catalyst, the ratio of the mols of said oxygen to the mols of said iodine being greater than two.

References Cited

UNITED STATES PATENTS 2,719,171  9/1955  Kalb _____ 260—669
2,921,101  1/1960  Magovern _____ 260—680

PAUL M. COUGHLAN, JR., *Primary Examiner.*